United States Patent [19]

Elliott

[11] 3,851,335

[45] Nov. 26, 1974

[54] BUFFER SYSTEMS

[75] Inventor: Joseph E. Elliott, Boulder, Colo.

[73] Assignee: International Business Machines Corporation, Armonk, N.Y.

[22] Filed: July 30, 1973

[21] Appl. No.: 383,648

[52] U.S. Cl. .................................. 360/26, 307/269

[51] Int. Cl. ......................... G11b 5/02, G06k 7/016

[58] Field of Search .................. 235/151.3; 307/269; 340/146.1, 172.5, 174.1; 360/26

[56] References Cited

UNITED STATES PATENTS

| | | | |
|---|---|---|---|
| 3,206,737 | 9/1965 | Lee et al. | 340/174.1 |
| 3,239,809 | 3/1966 | Cogar et al. | 340/146.1 |
| 3,710,358 | 1/1973 | Gindi | 340/174.1 B |
| 3,736,582 | 5/1973 | Norris | 340/174.1 H |
| 3,739,154 | 6/1973 | Corcoran | 340/174.1 B |
| 3,739,154 | 6/1973 | Corcoran | 340/174.1 B |
| 3,764,784 | 10/1973 | Haner et al. | 235/150.3 |
| R25,527 | 3/1964 | Floros | 340/172.5 |

*Primary Examiner*—Gareth D. Shaw
*Assistant Examiner*—Michael Sachs
*Attorney, Agent, or Firm*—Herbert F. Somermeyer

[57] ABSTRACT

A single up/down counter controls a first-in/first-out shift register type buffer. Each buffer shift stage has a read-out gate selectively activated by the counter. The counter counts up one for each data input, while the shift register simultaneously shifts all data signals one shift stage. For read-out, the counter is decremented, while no action is taken on the shift register. Simultaneous input and read-out does not affect the counter while the shift register shifts its signal content by one stage. A plurality of such shift registers and counters is interconnected by a common output control for de-skewing signals from a multichannel signal system, such as from a multitrack digital recorder.

30 Claims, 4 Drawing Figures

TIMING FOR CHANNEL 14

BUFFER SYSTEMS

DOCUMENTS INCORPORATED BY REFERENCE

U.S. Pat. No. 3,078,377 shows a signal resynchronization system.

U.S. Pat. No. 3,145,293 and No. 2,848,166 show up/down counters.

U.S. Pat. No. 3,654,617 shows a tape recorder system in which the present invention may be advantageously employed in its PE detection circuits 103.

U.S. Pat. No. 3,246,315 shows a signal code decoder. The output signals are connected to pulse form by gating the output signals from element 12 by timing pulses.

BACKGROUND OF THE INVENTION

The present invention relates to first-in/first-out buffers, particularly those types suitable for use in deskewing systems.

First-in/first-out buffers find wide application in data processing apparatus to facilitate signal transfers between two asynchronously operating portions and the like. Such buffering has been used in one form or another since the advent of electronic digital computers and associated peripheral equipment, sometimes referred to as peripheral subsystems. Various control schemes have been employed to ensure a smooth flow of data signals through such buffers. For example, Floros in U.S. Pat. Re. No. 25,527 shows a first-in/first-out deskewing buffer for a digital tape recorder and the like wherein the buffer receives signals whenever the supplying system (tape unit) supplies signals. In the Floros system, outputs were provided as accumulated in the buffer; i.e., the buffer in part determined the rate of signal transfer. Buffers also are used wherein the input signals are transferred whenever the buffer is not full and transferred out to a receiving apparatus upon its demand.

An important factor in selecting a buffer for a given data processing application is cost and performance. To reduce cost while maintaining buffering performance, the number of buffer positions should be minimized while keeping controls simple and reliability high. Also, the rate of circuit operation for a given data transfer rate (maximum) should also be minimized. The present invention accomplishes these desirable ends via shift register buffers. The invention avoids the necessity of an output counter, such as used by Floros.

Shift register buffers have been used both for rate changing (between asynchronous portions) and deskewing (tape systems). While such prior systems perform a buffering function, not all of the above-stated objectives have been accomplished in the facile manner of the present invention. For example, in one shift register system, all outputs were taken from the last shift stage of each buffering shift register. This arrangement required that all input signals be rapidly shifted toward the shift register output end. At low data rates, this arrangement is quite satisfactory; however, as data rates continually increase, the required cicruit speeds become demanding, hence, expensive. Another shift register deskewing buffer system employed two alternately used shift register buffers. Signals are applied to one shift register buffer until it is full. Then, that shift register buffer is read out while the alternate shift register buffer is receiving data signals. Such an arrangement is an effective buffer, but does not achieve the highly desirable cost goals. Another shift register buffer employed a parallel operated control shift register. Whenever a data signal was entered into the buffer shift register (1 or 0) a "1" signal was inputted to the control system. The maximum skew that can be accommodated is one less bit position of skew less than the number of shift stges in the deskewing registers.

In most deskewing systems, it is required that the signals being applied from the various inputs be geometrically aligned transverse to the plurality of channels. That is, if there is a four-stage shift register for nine channels, before the position three is read out, it is required that all positions three be filled. As a result, the maximum skew that can be accommodated is always one less than the number of deskewing positions or buffering positions.

SUMMARY OF THE INVENTION

It is an object of the present invention to provide an improved single-counter controlled first-in/first-out buffer.

It is a further object, in conjunction with the immediately preceding object, to provide simplified, low-cost, improved, deskewing buffes which utilize a maximum deskewing capability of the buffers.

A feature of the present invention is the simultaneous read-out of assembled information signals from any position of the buffer irrespective of the skew relationships to thereby maximize the utilization of the buffer positions. In accordance with one aspect of the present invention, a digital signal buffer unit comprises a data signal shift register having one or more stages in parallel, i.e., can store one or more parallel signals in any of the shift stages. Such register has a given number of shift stages interconnected to transfer digital signals from an input stage toward a last stage. Each such shift stage has an output gate. An OR circuit means receives the outputs from all the gates for combining the output signals.

A single up/down counter having said given number, plus one, of stable count-indicating signal states controls the shift register. One of the counting states is a reference state indicating that the shift register buffer is empty with the remaining given number of signal states indicating which one of the shift stages has the first-in signal, that is, the signal to be read out next. The up/down counter is connected to the output gates such that a signal state in the counter enables the respective one of the output gates whereby the count in the counter determines which shift stage is read out. Input means supply data signals to the input stage of the shift register. An input control means supplies an input control signal to simultaneously actuate the shift register to shift its signal contents toward a last stage, and simultaneously actuate the counter to count up one. Output means receive the buffer output signals. Output control means supply an output control signal to the counter for actuating the counter to count down one and simultaneously cause transfer of the signal content of the shift register stage indicated by such count state. In the event there is a count up and a count down requirement at the same time, counter action is inhibited while the shift register shifts its signal contents one shift stage.

By using a common control, element deskewing apparatus can be constructed by combining a plurality of the above-described buffer registers and conters together. When all of the registers have received at least one data signal, read-out is permitted.

The above buffers and deskewing apparatus can be used in those systems wherein the input is time dependent requiring the buffer to receive input signals as presented, while the output means can receive signals as they are available from the buffer. In the alternative, the buffer may operate with an input system wherein input signals are inserted into the buffer on a not-full basis; while the output system receives data signals whenever it needs them.

Various types of counters and electronic circuits, including integrated circuits, may be utilized in practicing the present invention. The invention is also usable not only in magnetic tape readback systems and communication channels, but also in internal apparatus having high data transfer rates wherein electrical circuit parameters generate skew in the system; and deskewing apparatus is necessary or desirable for realigning the time-perturbed transmitted signals.

Excessive skew and marginal skew detection circuits cooperate very efficiently with the counter control deskewing apparatus for effecting close system control over deskewing operations.

The foregoing and other objects, features, and advantages of the invention will become apparent from the following more particular description of the preferred embodiment, as illustrated in the accompanying drawing.

THE DRAWING

DETAILED DESCRIPTION

Figure 1:
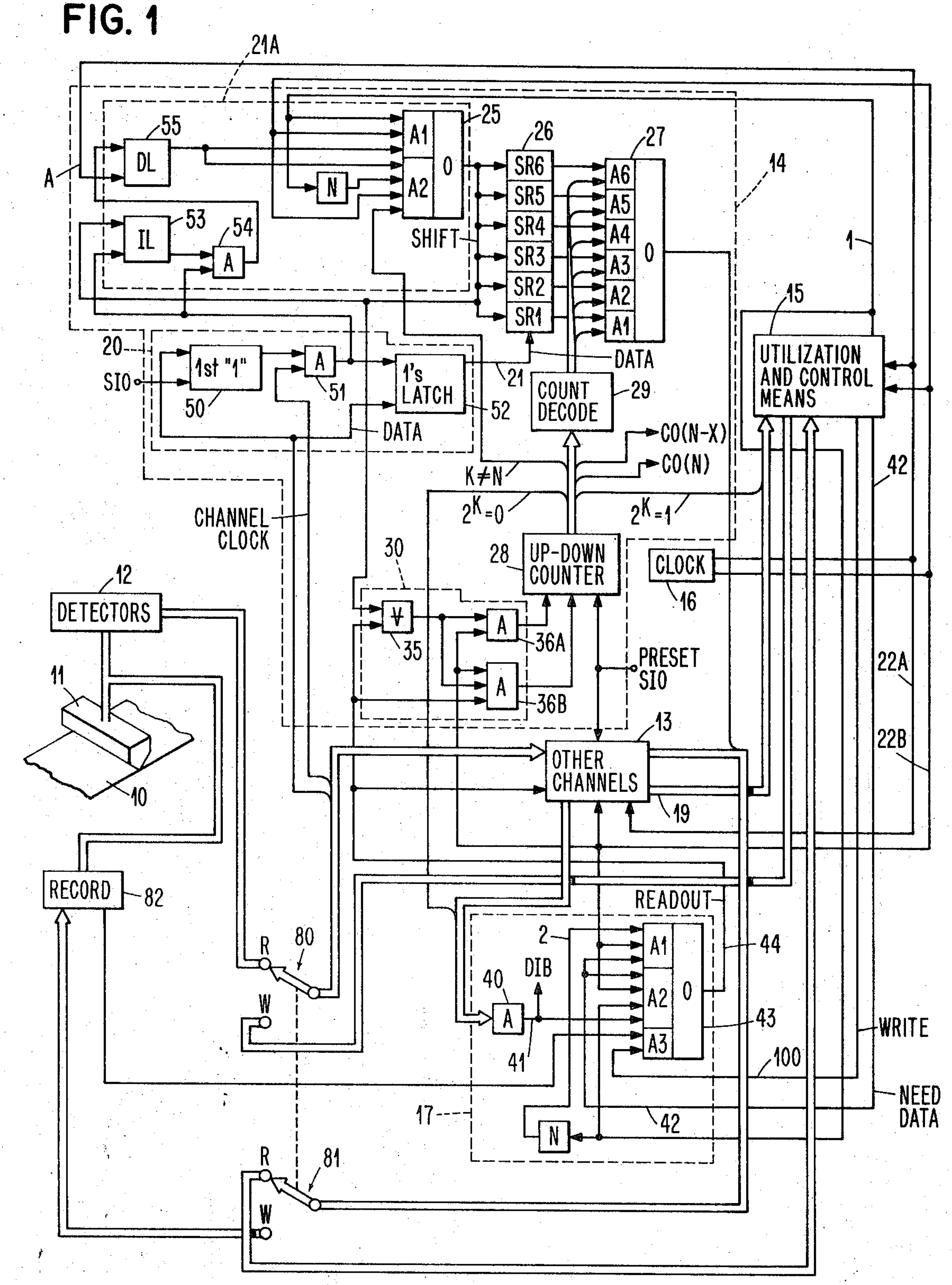
FIG. 1 is a block diagram of a preferred form of the invention and shows added controls for enabling operation of this preferred form in various system environments.

Since the original embodiment of the invention was intended to be used in a digital signal recorder of the multitrack type, i.e., a tape subsystem, the present description is directed to that end, no limitation thereto intended. In such a system, multitrack tape 10 has signals recorded thereon and serially sensed by multitrack transducer or head 11. The sensed signals are suitably amplified and processed, then supplied to a plurality of self-clocking detectors 12, such as shown by Thompson in U.S. Pat. No. 3,217,183. The detected output signals are supplied to a plurality of channel buffer units 13 and 14, channel 14 being expanded in detail for an explanation of the present invention. The other channel buffer units 13, which may contain eight such buffer units as shown in box 14, are constructed identically.

Signals supplied by detectors 12 are asynchronous in that each channel has its own timing circuits. Because of skew between data signals recorded on tape 10 and head 11, the time of occurrence of a signal within any byte recorded across tape 10 may be several bit periods apart; a bit period being that time which elapses for the length of tape 10 to pass over one bit cell or one recorded bit by the gap portion of a transducer 11. In accordance with the invention, the asynchronous signals are assembled and deskewed in channel buffer units 13 and 14 and then sent as bytes of detected data to utilization and control means 15 over cable 19. Timing generator or clock 16 times operation of utilization and control means 15, then, simultaneously supplies timing pulses to channel buffer units 13, 14 for synchronizing operation thereof, as will be more fully explained. In the illustrated embodiment, utilization and control means 15 may include a digital computer, such as shown and described in Amdahl, et al, U.S. Pat. No. 3,400,371, no limitation thereto intended. Additonally included in the utilization and control means 15 are the channel portions of the above-referred-to Irwin U.S. Pat. No. 3,654,617 which transfer deskewed signals to the Amdahl, et al, described computer. In that event, a so-called "start read clock" signal is generated whenever at least one digital signal has been lodged in each and every buffer register, as would be detected by common control 17 and later described. In the present application, such start read clock signal is the date-in buffer (DIB) signal supplied over line 41 indicating buffer unit read-out operations may ensue. In the illustrated system, the DIB signal merely gates timing pulses from clock 16 for sequencing the illustrated apparatus.

First-in/first-out buffers of the type shown in channel buffer unit 14 can operate in first (active signal on line 1) and second modes (active signal on line 2). In the first mode, which is the mode operated with a preferred form in a tape subsystem, it is required that the buffer accept data signals as they are presented to the buffer by the input means, i.e., by detectors 12. The reason for this is that magnetic tape 10 is being transported at a relatively constant speed, and it is difficult to change that speed in order to accommodate small, electronic perturbations. Accordingly, a limiting factor in such recorders is the ability to change the tape speed. Accordingly, to accommodate such difficulty, electronic buffers are designed to operate to accept data with the output signals supplied over cable 19 being supplied on as "as-available" basis; i.e., at least one byte of data signals must be assembled in the channel buffer units 13 and 14.

On the other hand, the deskewing apparatus, as well as the individual channel buffer units, can operate in a second read mode denoted in the drawing by lines enumerated by numeral 2, wherein the input signals are received only as the buffer has available room; while the output signals on cable 19 are supplied as soon as the utilization and control means 15 needs data as indicated by the signal on line 42. In the latter case, a stepping motor driven tape may provide the input signals as opposed to a tape being driven at constant speed.

The buffer system can also be used in a write or recording mode. Since a tape is moving at constant velocity, buffer operation is in a mode 2; the direction of data signal flow is toward the tape. To this end, byte-pole double throw switches 80, 81 reverse buffer 13, 14 connections. For a read operation, switches 80, 81 are set to R connecting detectors 12 outputs to the buffer inputs via switch 80 as herein described. Switch 81 connects the buffer 13, 14 outputs to utilization means 15. Setting switches 80, 81 to W connects means 15 to the buffer inputs and the buffer outputs to record circuits 82 and, thence, to tape 10 via write portions in head 11. The controls for the write mode are described later.

Channel Buffer Unit 14

The detected self-clocked signals from detectors 12 are supplied to channel buffer unit 14 via its synchronization circuit 20. A purpose of synchronization circuit 20 is to ensure that full pulse amplitudes are supplied as buffer input signals over line 21 in exact synchronism with clock 16 timing pulses supplied on lines 22B. Clock circuit 20A produces a gate or shift signal to cover a single full-width clock 16 pulse on line 22B as a result of each detector 12 self-clocking signal. Detector 12 output data signals on line 21 change at the start of each self-clocking signal bit period.

Figure 1A:
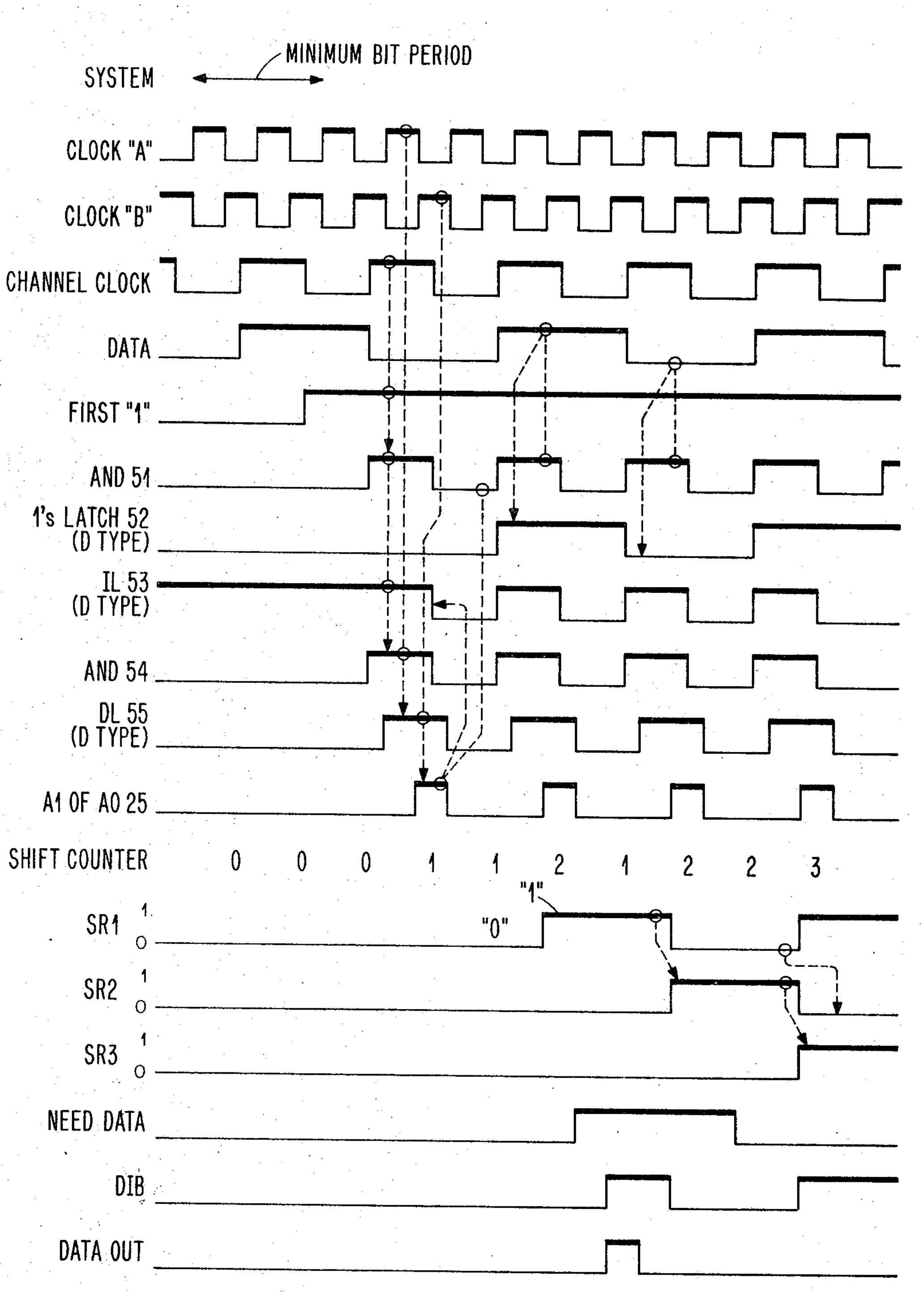
FIG. 1A is a timing diagram for the FIG. 1 illustrated apparatus.

Referring to both FIGS. 1 and 1A, clock 16 supplies two clock phases A and B, respectively, over lines 22A, 22B. For each bit period of any self-clocking signal, there are at least two phase A and two phase B clock signals. Accordingly, during each bit period, a data signal enters shift register input digit postiion SR1 once during a clock phase B time, while the phase A clock signals are used in circuit 21A for synchronization and interlocking purposes, i.e., assist in inhibiting one data signal from entering SR1 twice in its bit period.

The first data bit detected for any channel sets its respective first 1's latch 50, signifying data signals follow. This type of operation has been followed for years in digital magnetic tape recorders. Latch 50, initially reset by an SIO (start input output operation), being set enables AND circuit 51 to pass the read clock or channel clock signals. One cycle of channel clock signal identifies one bit period, with each positive going transition arbitrarily identifying the beginning of each bit period. AND 51 enables 1's latch 52 (a D-type latch) to receive channel data signals during the first half of each bit period. Such data signal was detected in the immediately preceding bit period by the corresponding detector 12. When such data signal is a binary 1, latch 52 is set to active condition, when a binary 0 latch 52 is set to an inactive condition. Such data signal is supplied by latch 52 to SR1 input stage of shift register 26 to be gated in under clock 16 B pahse via control circuit 21A.

Channel clock to system clock synchronization for gating the latch 52 contained data signal is performed once each data bit period. AND 51 output signal resets clock interlocking latch (IL) 53, signifying onset of a new bit period from which data has not been stored in SR1. IL 53 enables AND 54 to pass AND 51 output signal to set data ready (DL) latch 55. Latch 55 then partially enables both AND input portions of A-0 25. In either Mode 1, Mode 2, or write, A-O 25 supplies a shift pulse to all stages SR1–SR6 of shift register 26, simultaneously shifting its content one stage toward SR6, including inserting latch 52 data signal into SR1. Such data insertion and shifting is timed by the B phase clock signal from line 22. The immediately following A phase clock signal resets DL 55, disabling A-O 25.

Interlocking results from A-O 25 shift pulse, setting IL 53 to the active condition. By this time, the positive portion of the channel clock has subsided. The duration of the channel clock may be made short, or AND 51 can be constructed with a differentiater to supply a pulse of short duration. The above cycle is repeated for each data bit period.

In Mode 1, i.e., a preferredmode, the Al input portion of A-O 25 jointly enables shift register 26 to receive the data signal from latch 52 as well as transfer the signal contents of each of its stages from the input stage SR1 to the next shift stage up to and including the last stage SR6. When shifted out, the signal contents of SR6 are lost. The A1 input portion of A-0 25 jointly responds to the Mode 1 signal from utilization and control means 15, a timing signal from line 22B, and the data-ready signal from DL 55 to supply an actuating signal to the input stage SR1 and all of the other stages SR2–SR6 for effecting transfer of data signals in accordance with known techniques. Shift register 26 may be constructed in accordance wtih Maley U.S. Pat. No. 3,083,305 or any other suitable timed shift register of any construction so long as the logic elements are capable of shifting at a rate sufficient to accommodate the desired data rate of the system. Each shift stage of register 26 has an output line supplying a respective AND input portion of A-O 27. SR1 supplies its output signal to the A1 input portion, etc., of A-O 27. In this manner, any signal content of any shift stage of shift register 26 can be used as an output signal through A-0 27, thence, to cable 19 for transfer to utilization and control means 15. In this manner, A-O 17 constitutes scanning means for transferring signals from any shift register stage to cable 19.

To accomplish the above-mentioned shift register buffer operation, up/down counter 28 (constructed in any form, but preferably constructed as shown in one of the referred-to patents, a supra) is incremented each time an input signal is entered into SR1 under control of A-0 25 shift pulse. As will become apparent, up/-down counter 28 is decremented each time one of the shift register stages transfers its signal to its respective AND input portion to cable 19. Up/down counter 28 has storage stages which apply their count-indicating signal to a pulse decoder 29 constructed without limitation such as shown in U.S. Pat. No. 3,246,315.

Figure 3:
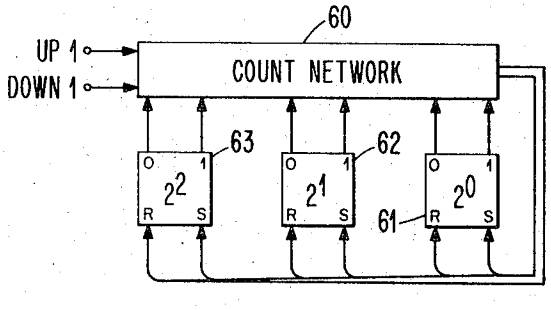
FIG. 3 is a simplified diagram of an up/down counter having binary storage latches.

The cooperative relationship between up/down counter 28, A-O 27, and shift register 26 is best understood by reference to Tables I and II. Table I shows the operation of up/down counter 28 when it is a ring or shift register type counter, while Table II is useful for showing operations when counter 28 is a binary counter, such as shown in FIG. 3.

TABLE I

| Count State | Ring Counter Count | Buffer Contents |
|---|---|---|
| 0 | 0 111 111 | Empty |
| 1 | 1 111 110 | DIB* |
| 2 | 1 111 101 | DIB |
| 3 | 1 111 011 | DIB |
| 4 | 1 110 111 | DIB |
| 5 | 1 101 111 | DIB |
| 6 | 1 011 111 | Buffer Full |
| 0 | 0 111 111 | Overrun |

*DIB = Data In Buffer

In the above table, the count state transferred to pulser decoder 29 is shown in the left-hand column. The actual ring counter binary values (signal content) are shown in the center columns, while the buffer contents of shift register 26 are shown in the righthand column. The count state of 0 is a so-called "reference" state indicating that the buffer is empty. This is signified by the leftmost digit postiion of the up/down counter being zero. When the first data bit is entered into SR1, the counter is incremented to count state 1 indicating there is data in the buffer and the value of the counter is N-5, (N is 6 in the illustrated embodiment), N being a positive integer indicating the count modulus. In a similar manner, as additional data signals are inserted into SR1, the counter is incremented as indicated by the count state. The xero digit in the ring counter count indicates the shift register stage containing the first-in data bit. In the event the counter goes from count state 6 to count state 0, an overrun condition is indicated. Such overruns are handled as usual error conditions not pertinent to the practice of the present invention. For example, if the content of shift register 26 one stage is to be read out and the count state is 5, then the signal contents of SR5 are transferred through A5 input portion of A-O 27 to cable 19.

TABLE II

| Binary Counter Contents | Count State | Buffer Status |
|---|---|---|
| 011 | 0 | Empty |
| 100 | 1 | DIB |
| 101 | 2 | DIB |
| 110 | 3 | DIB |
| 100 | 4 | DIB |
| 101 | 5 | DIB |
| 110 | 6 | Full |
| 111 | 0 | Overrun |

(Underrun = 011 and need data)

In the above table, when the binary counter is 011, this represents a count state 0. Note that the leftmost or most significant digit position being 0 signifies an empty data buffer in the same manner as was described for a ring counter up/down counter embodiment. Upon inserting the first data bit into SR1, the counter is incremented to count state 1, or a binary value of 100 indicating that the first-in bit is in SR1. As the counter is incremented toward the value of six, the first-in bit is correspondingly indicated in the successively higher numbered shift register stages. When SR6 has received the data bit, the buffer is full as indicated by the count state of 6. The counter is interconnected in such a manner that if the counter is again incremented, a 111 state is provided; indicating an overrun condition. Alternatively, the 110 state and an increment pulse may cause the counter to step to a 011. On the other hand, for Mode 2 an underrun is indicated when the binary counter has a value of 011 or the ring counter has the 0 count state, need-data signal is supplied over line 42, and Mode 2 or write is active and first data has been inserted into the buffer.

An interesting aspect of the counter 28 and shift register 26 interrelationship is that the counter determines which shift stage is to be read out. The data that has been read out through A-O 27 still resides in the shift register. However, it cannot be read out and is lost by shifting through SR6. For example, if SR3 is read out at time 1, then the signal content of SR3 is supplied to SR4 upon the occurrence of a new input bit signal over line 21. However, it must be remembered that when SR3 was read out through A-O 27, counter 28 was decremented one indicating that the first-in bit had not yet been read out and was in position SR2. Accordingly, there is no need for erasing or clearing the shift register stages on read-out because the counter prevents access to such previously read out data signals.

The read-out cycle of shift register 26 can be one of two modes. In the event channel buffer unit 14 is used as a first-in/first-out buffer without deskewing, then the need-data signal on line 42 is supplied directly through A-O 43 over line 44, thence to AND 33. The timing pulse from clock 16 then is passed through AND 33 to pulser decoder 29 to supply an output gating pulse which is supplied to one and only one of the AND input gating portions of A-O 27 causing the read-out. In such latter embodiment of channel buffer unit 14, it may be desired to buffer more than one signal at a time. For example, line 21 may be a cable carrying a plurality of signals in parallel, not necessarily from a magnetic tape. For example, in a byte buffering system, eight signals plus the parity signal are supplied as a unit successively to shift register stages SR1–SR6. In that case, pulser decoder 29 activating a given A input portion of A-O 27 would cause a signal byte to be transferred from cable 19, then, utilization means 15 and one counter 28 for all channels is provided. In another embodiment, it may be desired to have a shift register buffer which buffers 80 bits of data in parallel. In that case, each shift register stage SR1 would contain 80 latches of shifting flip-flops for accommodating such 80 bits as a unit through the shift register buffer.

It should also be noted that the data input signals from latch 52 are independent of the output signals being supplied through A-O 27. Under the described system and control of clock 16 timing pulses, simultaneous input to SR1 is possible with outputs being provided through A-O 27. In this case, shift register 26 shifts its signal contents one shift stage toward the last position SR6, while counter 28 is not altered. Counter control 30 enables this function. Exclusive-OR 35 compares the read-out requirement signal on line 44 which, in the single buffer condition, is a need-data signal on line 42 with the data-ready signal on line 23. If they are different, a signal is supplied to AND circuits 36A and 36B for respectively incrementing or decrementing the counter. AND 36A receives the timing pulse and the data-ready signal for generating an increment pulse. In a similar manner, AND 36B receives the need-data signal timing pulse, plus Exclusive-OR 35 output signal, to decrement the counter. In the event both signals are present at the same time to Exclusive-OR 35, it applies no active output signal thereby causing up/down counter 28 not to be altered. However, the active data-ready signal from A1 input portion of A-O 25 still shifts shift register 26. In this manner, the input signal is supplied to SR1; while the read-out signal, for example, from SR3 is shifted to SR4 and while the counter indicates that the first-in bit yet to be read out is still in SR3, which is the case.

The operation of channel buffer unit 14 in the second mode includes shifting register 26 contents via A2 portion of A-O 25. This input portion is activated jointly by the Mode-2 signal, the data-ready signal on line 23, the timing pulse on line 22, and the signal K ≠ N from pulser decoder 29. The latter indicates that shift register 26 is not full. That is, at least shift stage SR6 is empty. When K=N, the shift register is full as indicated in the above tables. Read-out of shift register 26 during Mode 2 has previously been described with respect to common control 17. In the event shift register 26 is used as a buffer, not a part of the deskewing apparatus, then the need-data signal on line 42 is directly connected to line 44.

The write mode operates the buffer in the same manner as Mode 2 except that switches 80, 81 reverse direction of data flow. Read-out control A-O 43 is activated via A3 input portion. A3 responds to write signal over line 100 from means 15 and a write clock signal from record circuits 82 to initiate readout from the buffer to record circuits 82. The write clock (not shown) in record circuits times the recording in a known manner. The read-out controls use A-O 25 A2 portion, i.e., not Mode 1. All counters 28 step together.

Deskewing Apparatus

The preferred embodiment employs channel buffer unit 14 within a deskewing apparatus. To this end, common or deskewing control 17 controls a set of counter shift register combinations as shown for channel buffer unit 14 in common with the other channel buffer units 13 in the following described manner. The count from the counters 28 in all of the channel units' most significant digit position, i.e., ones that indicate data in the respective channel buffer unit shift register, is supplied to AND circuit 40 within common control 17. If all of the most significant digit positions are in the zero state, i.e., data is in the respective channel unit buffer shift register, then AND 40 supplies a DIB signal over line 41, as above referred to. The DIB signal goes to the A2 input portion of A-O 43 for generating a read-out signal on line 44 during the first mode. An additional input signal is from the need-data signal on line 42 and the Mode-1 active signal on line 1. This DIB signal goes to all of the channel units, causing simultaneous read-out from all of the shift registers in all of the buffer units to the respective A-O's 27, thence, in precise synchronism over cable 19 to utilization means 15.

Common control 17 also works in Mode 2 through the A1 input portion of A-0 43. To this end, the need-data signal on line 42 and the Mode-2 signal on line 2 actuates the A1 portion to emit the read-out signal to line 44. In the event there is not data in the buffer, an error condition is detected and indicated as shown with respect to FIG. 2. Note that the DIB signal does not enter into Mode 2 operation.

Buffer Operation

Operation of each shift register 26 as a first-in/first-out buffer unit is better understood by reference to Table III.

TABLE III

| Buffer Cycle | BUFFER COUNTS Counter End of Cycle | Read-In | Read-Out |
|---|---|---|---|
| 0 | 1 | * | |
| 1 | 2 | * | |
| 2 | 3 | * | |
| 3 | 4 | * | |
| 4 | 5 | * | |
| 5 | 6 | * | |
| 6 | 6 | * | * |
| 7 | 6 | * | * |
| 8 | 5 | | * |
| 9 | 4 | | * |
| 10 | 5 | * | |

The clock cycle is shown on the left-hand column. The counter 28 signal contents are shown in the second column, and the read-in operation during a given clock cycle is indicated by an asterisk; while the read-out operation is indicated by an asterisk in that column. In clock cycles 0–5, there is only read-in, which advances the counter from 0 to 6. In clock cycles 6 and 7, there is both a read-in and read-out. During these two clock cycles, there is no count and no change in up/down counter 28; however, the shift register continues to shift the data as above indicated. In clock cycles 8 and 9, there is read-out without read-in thereby decrementing the counter from 6 to 5 to 4; while in clock cycle 10 there is a read-in only, again incrementing the counter.

Deskewing Operation

The above buffer operation for a single shift register first-in/first-out buffer is applied to deskewing as shown in Table IV.

TABLE IV

| Clock Cycle | FOUR CHANNEL DESKEW COUNTS A | B | C | D | Read-In | Read-Out |
|---|---|---|---|---|---|---|
| 0 | 0 | 0 | 0 | 0 | | |
| 1 | 1 | 0 | 0 | 0 | * | |
| 2 | 2 | 0 | 1 | 0 | * | |
| 3 | 3 | 1 | 2 | 0 | * | |
| 4 | 4 | 2 | 3 | 1 | * | |
| 5 | 3 | 1 | 2 | 0 | | * |
| 6 | 4 | 2 | 3 | 1 | * | |
| 7 | 3 | 1 | 2 | 0 | | * |
| 8 | 4 | 2 | 3 | 1 | * | |
| 9 | 4 | 2 | 3 | 1 | * | * |

For this operation, four channels to be deskewed are shown. The channels are A, B, C, and D, with numerals thereunder in the respective columns indicating the value of the count in the respective counters. This corresponds to the count state in Tables I and II. Clock cycles are enumerated as in Table III, as are the read-in and read-out operations. The initial contents during clock cycle 0 are all zero, i.e., data has not been read into the deskewing apparatus. The first read-in occurs during clock cycle 1, in which channel A reads in one bit of data. The shift registers in channels B, C, and D, which consist of the other channel buffer units 13, have not yet received data. Therefore, read-out is not permitted since AND 40 is not satisfied.

In a similar manner, read-in occurs during cycles 2, 3, and 4. Note that during clock cycle 4, channel D (the most-lagging channel) has received signals in its SR1. At this instant of time, channel A has four bits read into its shift register, channel B has two bits, and channel C has three bits as indicated by the counts respectively. At clock cycle 5, there is no read-in; however, there is a read-out since all four channels have supplied signals to the respective channel buffer units. Read-out is as follows: channel A from position 4, channel B from position 2, channel C from position 3, and channel D from position 1.

At the end of this cycle, each of the counters are decremented by one. Channel A goes from 4 to 3, channel B goes from 2 to 1, channel C goes from 3 to 2, and channel D goes from 1 to 0. Channel D is again empty indicating that no deskewed data is available. However, in clock cycle 6, another read-in occurs with channel D again counting up to 1 indicating that another byte of data has been assembled; i.e., all of the counters are in a nonzero or nonreference state. In cycle 7, a read-out occurs with no simultaneous read-in. Therefore, the counters are all decremented again. It should be noted when one channel is the last to send in data, its counter will oscillate between one and zero provided the utilization means receive signals at the maximum possible rate; while the other channels will oscillate between counts in accordance with the respective time of receipt position of the signals in those channels.

In clock cycle 8, another read-in occurs advancing the counters by one. However, in clock cycle 9, there is both a read-in and a read-out of deskewing. In this case, the counts do not change as above explained. In the event the utilization means 15 does not accept data as fast as it is accumulated in the slowest channel, that counter could increment to a value equal to the modulus of the counters less the maximum skew of the system, i.e., the count indicating the greatest time difference between the most-leading channel and the latest or slowest channel. Such count information can be supplied to utilization means 15 over cable 18. The other outputs from up/down counter 28 of buffer unit 14 are used in skew detection as will be explained with respect to FIG. 2.

Skew Detection

Figure 2:
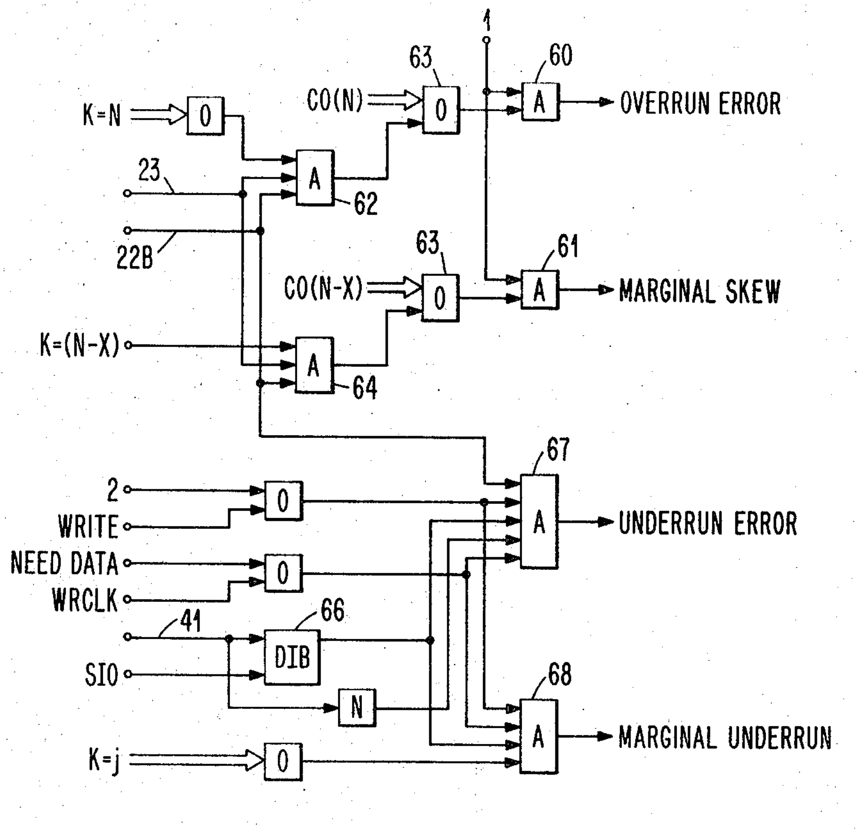
FIG. 2 is a simplified logic diagram showing skew detection using the FIG. 1 illustrated apparatus.

Referring next to FIG. 2, overrun and underrun detection circuits are shown. In a practical embodiment, only one detector is used for detecting overrun and another for underrun. Since two criteria are available, multiple detectors are illustrated for each error condition. Overrun is defined as loading signals into shift register 26 such that data is shifted out of SR6 before it is read out of cable 19. An overrun error is indicated by AND 50 in the first mode whenever any up/down counter 28 has a carry-out of its Nth (CON) signal state (a digit has shifted out of SR6 and is lost), or AND 52 indicates an overrun error. In this instance, the count in a counter 28 is equal to N, and the data-ready signal on line 23 is active when clock 16 is supplying a timing pulse over line 22. At this point in time, data has not been destroyed by shifting it out of SR6. An overrun is about to occur.

Such overrun can occur more frequently in a deskewing apparatus. Detection of such overrun has been accomplished in accordance with the Morphet U.S., Pat. No. 3,154,762 wherein there is a comparison of signal counts. However, in the FIG. 2 illustrated apparatus, any counter equalling N with its data ready in its corresponding channel indicates an overrun or excessive-skew condition. Also, the CON (carry-out Nth count state) line in FIG. 2 can be from an OR circuit (not shown) connecting all of the up/down counters to OR 53 for indicating overrun or excessive skew in the multichannel situation. Accordingly, when practicing the present invention, it is not necessary to compare the signal counts between various counters; rather, the count of each individual control counter for each buffer portion indicates possible excessive-skew conditions. Accordingly, another advantage of the present invention is the detection and indication of excessive skew without a comparison of various counters controlling signal transfer in a multichannel environment.

Additionally, in certain magnetic tape readback systems, the detection and indication of marginal skew can be employed to advantage for preventing catastrophic errors. For example, in Devore, et al, copending application, Ser. No. 317,985, filed Dec. 26, 1972, and commonly assigned, a marginal-skew condition is used as an error pointer for error correction purposes. In accordance with the present invention, such marginal-skew pointers are generated by any one of the buffer-controlling up/down counters independent of each and every other counter. By system analysis, it may be shown that when SR5 contains a data bit, as indicated by the respective count in any of the counters in a deskewing operation, the channel associated with such channel buffer unit is about to reach an excessive-skew condition with respect to the most-leading track. It may be that the leading track is out of skew with respect to all the other tracks or channels in the system. However, the count in any one of the counters is sufficient to indicate marginal-skew conditions. To this end, the carry in up/down counter 28 from state N-X to N-(X+1), which in this case is five, is supplied over line 70 through OR 53, thence, AND 51 to indicate marginal skew. It is understood that line 70 receives all such carry-outs denominated by CO(N-X) (carry-out from count state N-X). Additionally, AND 54 can indicate a marginal-skew condition by supplying a signal through OR 53, thence, AND 51. Whenever the up/-down counter 28 has a count state of N-X, which in this case is 6−1 (or 5), and data is ready as indicated by the signal on line 23, the timing pulse is passed as a marginal-skew indicating signal.

The circuitry in FIG. 2 below the Mode 1 indicating circuits are useful in the Mode 2 operation to indicate underrun; that is, one or more of the buffers is empty, when utilization means 15 needs data as indicated by the signal on line 42. In this case, the error condition is reflected in utilization means 15 not being able to acquire data at its required rate. An absolute underrun error is indicated by AND 57 when enabled by the Mode-2 signal, the need-data signal on line 42, the data-was-in-buffer signal from latch 56; while line 41 signal indicates no data in the buffer at the present time. DIB latch 56 is initially set by SIO (start input-/output operation) which indicates the onset of a data processing operation. When the first byte of data is assembled in the shift register 26 of channel buffer units 13 and 14, line 41 signal becomes active resetting DIB latch 56. DIB latch 56 being reset signifies that at least one byte of data has been assembled and that the data processing operation for transferring signals from tape 10 to utilization means 15 is ensuing. Since means 15 determine the data transfer rate, and if there are no signals in the buffer, an underrun error has occured.

Marginal skew toward underrun is indicated by AND 58. In this instance, at least all of the buffers should have signal content in shift stage SR2. This is indicated in FIG. 2 as any-counter-equal-*j*, where $j = 2$. Note that most of the counters should have a count greater than *j* under this circumstance. In other words, it is most desirable in Mode 2 operations that SR6 and at least one of the shift registers contain data signals and that none of them be empty toward SR1 in order to prevent underrun. DIB latch 56 again partially enables AND 58 with the need-data signal on line 42 and the timing pulse from line 22 to indicate marginal skew toward underrun.

A typical up/down counter 28 can be arranged as shown in simplified diagrammatic form in FIG. 3 and constructed in detail as shown in the reference to U.S. patents on the counter. The counter can be a three-stage counter for accommodating six stages of buffering. The three stages are latches 61, 62, and 63, which are respectively set and reset in accordance with count network 60. Network 60 translates the up-1 count and the down-1 count in accordance with the signal contents of latches 61, 62, and 63 to supply latch changing signals to the set and reset inputs, respectively, in accordance with the numerical contents of Table II. The details of the up/down count network are not shown because they are well known in the art.

The invention has been shown with a few specific embodiments, it being understood that various data pattern controls and up/down counters may be employed with equal success, that the form of the pulser decoder, shift registers, A-O's, detection circuits, and the like, can be suitably varied to accommodate various design choices and system requirements. An important aspect of the invention is that the up/down counters each have a count state one greater than the number of shift stages, which is defined as a first plurality of shift stages. The system can accommodate one channel for providing a first-in/first-out buffer system or can accommodate a given plurality of channels for deskewing or buffering operations. The various control circuits have been arbitrarily shown to illustrate how the various channel buffer units can operate together and be controlled for providing a simple control of up/down counters wherein an up count is toward a count state signifying the last shift stage SR6, while a down count signifies change in the meaningful data signal content of shift register 26 proceeding toward the input stage SR1. Selection of various circuits will alter the circuit design and appearance of any embodiment using the present invention, while still maintaining utilization of the inventive concept.

While the invention has been particularly shown and described with reference to a preferred embodiment thereof, it will be understood by those skilled in the art that various changes in form and detail may be made therein without departing from the spirit and scope of the invention.

What is claimed is:

1. A digital signal buffer unit comprising:

a data signal shift register having a given number of shift stages interconnected to transfer digital signals one stage at a time from an input stage toward a last stage, each stage having output gating means, OR circuit means for receiving signals from all said gating means to pass signals from any shift stage as buffer output signals;

an up/down counter having said given number, plus one, stable count indicating signal states, one of said states being a reference state with the remaining given number of said signal states indicating one of said shift stages, means connecting said up/down counter to said output gating means such that the respective output gating means is enabled by a one of said given number of indicating signal states;

input data means for supplying data signals to said input stage and having input control means for supplying input control signals to simultaneously actuate said shift register to shift the signal content of said shift register one stage at a time toward said last stage and actuate said counter to count up;

output data means for receiving said buffer output signals and having output control means supplying output control signals to said counter for actuating said counter to count down and said output control means simultaneously supplying one of said output control signals to said output gating means whereby the signal content of a given shift stage indicated by the signal state of said counter is read out from said given shift stage as a buffer output signal; and means responsive to simultaneous occurrence of said input and output control signals to inhibit said counter from changing signal states.

2. The digital signal buffer set forth in claim 1 further including in combination:

alarm means connected to said up/down counter and responsive to said up/down counter reaching a predetermined count state to indicate a buffer error.

3. The digital signal buffer set forth in claim 1 further including in combination:

clock means supplying timing pulses with a repetitive frequency at least as great as a maximum repetitive frequency of digital signal transfer;

synchronizing signal transfer means electrically interposed between said data signal shift register and said input and output means and responsive to said timing pulses to time signal exchanges between said shift register and said input and output means; and counter control means responsive to said timing pulses and to said input and output means to selectively actuate said up/down counter in synchronism with said synchronizing signal transfer means.

4. The digital signal buffer set forth in claim 3 further including in combination:

said clock means supplying A and B alternate successive timing pulses, one A and one B pulse being a timing cycle, said synchronizing signal transfer means and said counter control means being responsive to said B pulses and a portion of one of said data means being responsive to said A pulses such that said portion operates in alternate synchronism with said data signal shift register.

5. The digital signal buffer set forth in claim 4 wherein said one data means includes independent timing means for establishing bit periods wherein one data unit of signals is transferred, said bit period being of greater duration than said timing cycle;

said synchronizing signal transfer means being responsive to said clock means and to each A pulse to signify that a data unit of signals is ready to be transferred at the next succeeding B pulse time; and lockout means inhibiting plural successive signal transfers during a given bit period.

6. The digital signal buffer set forth in claim 5, further including in combination:

an AND-OR circuit having input AND portions connected to said shift stages, respectively, and to said up/down counter for being enabled by the count states, respectively, except by said reference state.

7. Skew buffer apparatus having a given plurality of shift registers, each shift register having a first plurality of bistable elements, each element constituting a shift stage, and means for transferring signals between said stages from an input one of said stages toward a last one of said stages, and each stage having an output signal gate;

the improvement including in combination:

a given plurality of up/down counters, each of said up/down counters operatively associated with a corresponding one of said shift registers, each said up/down counter having a first plurality, plus one, of stable count-indicating states and a first output connection for each of said first plurality of stable count-indicating states and a plus-one output connection for said plus-one stable count-indicating state, said first output connections of each up/- down counter respectively connected to said output signal gates of said corresponding shift registers for enabling same when said corresponding up/-down counters are in the respective count-indicating state;

a given plurality of data input means having data transfer means respectively connected to said input stage of each said corresponding shift register, plural input control means in each said data input means supplying control signals to said up/down counters, respectively, to actuate same to count up one state, to said data transfer means to simultaneously enable transfer of data signals to said respective input stage and to said shift register to shift the signal content thereof one stage toward said last stage; and a given plurality of data output means respectively receiving data signals from each said shift registers, a single output control means supplying control signals to all said up/down counters to count down by one state for enabling transferring data signals from shift stages respectively indicated by the respective up/down counter count-indicating signal state.

8. The skew buffer apparatus set forth in claim 7 further including counter control means for each of said up/down counters, each said counter control means being responsive to said input control means control signals, respectively, and to said output control means control signal occuring simultaneously to inhibit count changes, and at all other times permit count changes in accordance with said control signals, respectively.

9. The skew buffer apparatus set forth in claim 8 further including clock means supplying A and B alternate successive timing pulses at a pulse repetitive frequency greater than expected data signal repetitive frequency;

said data input means being responsive to said A timing pulses to signify data signals available; and a signal transfer circuit interposed between each said data input means and each said shift registers, respectively, and responsive to said A timing pulses to receive said data signals and each said input control means being responsive to received data and said B timing pulses to supply said input control signals, respectively.

10. The skew buffer system set forth in claim 9 wherein each said data input means comprises a readback channel of a multitrack magnetic tape recorder each generating a readback signal;

VFC means in each said readback channel responsive to said readback signal in such readback channel to generate a bit period signal;

detection means in each said readback channel jointly responsive to said bit period signal and said readback signal of such readback channel to supply a data signal;

an interlock circuit in each said data input means signifying data when conditioned, otherwise signifying not data;

said input control means of each said data input means responsive to said bit period signal to condition said interlock circuit to signify that data can be received from said readback channels, respectively;

data indicator means in each said input control means jointly responsive to said interlock means signifying data and said bit period signals, respectively, to supply said input control signals for the respective data input means;

gating means responsive to said control signals and said data signals from the data input means, respectively, to insert said data signals into said shift registers, to decondition said interlock circuit, and to actuate said up/down counters, respectively; and said data indicating means responsive to each A pulse to assume a reset state.

11. The skew buffer system set forth in claim 10 wherein said clock means supplies about two cycles of A and B timing pulses per one of said bit periods; and each said output means being independently responsive to its associated up/down counter and to said output control means to transfer a signal from its connected shift register stage indicated by the corresponding active count state of such associated up/down counter.

12. The skew buffer apparatus set forth in claim 11 wherein each said output means comprises an AND-OR circuit, one AND input portion for each said shift stage and responsive to one of the count states to pass the signal content of said shift stages, respectively, to an output OR portion; and means simultaneously receiving signals from all said AND-OR circuits.

13. The skew buffer apparatus of claim 7, further including in combination:

a magnetic tape transport apparatus having a multitrack head with recording and sensing portions for scanning tracks on a tape;

utilization means for data signals;

first and second double-throw multiple pole switching means each having center, read, and write connection means, common control means connected to both said switching means, for selectively respectively connecting said center to said read or write connection means of said switching means;

said center connection means of said first switching means respectively connected to all said input data means;

said read connection means of said first switching means respectively connected to said sensing portions;

said write connection means of said first switching means respectively connected to said utilization means;

said center connection of said second switching means respectively connected to said output data means;

said read connection means of said second switching means respectively connected to said utilization means; and said write connection means of said second switching means respectively connected to said recording portions.

14. The apparatus of claim 13 further including in combination:

clock means supplying alternate successive A and B timing pulses to time said utilization means and said input and output data means; and means in said input data means responsive to said B timing pulses to generate said control signal and to said A timing pulses to deactivate said input means until new data signals are available.

15. The skew buffer apparatus set forth in claim 7 wherein each said up/down counter has N stable counting states, N being an integer one greater than the number of shift stages in each said shift registers;

each up/down counter having carry-out means for said $N^{th}$ count state for supplying a carry-out signal; and alarm means responsive to any one of said carry-out means supplying a carry-out signal to indicate an error.

16. The skew buffer apparatus set forth in claim 15 further including carry-out means for each up/down counter for each N-X signal state, where X is a positive integer; and marginal skew means responsive to any N-X carry-out signal to signify a marginal error condition.

17. The skew buffer apparatus set forth in claim 7 further including count decoding means responsive to any said up/down counter having a count state of N (where N is an integer equal to the number of said shift stages in a shift register), plus one, and to one of said control signals to signify an error condition.

18. The skew buffer apparatus set forth in claim 17 further including means in said count decoding means responsive to any up/down counter having a count state of N-X, where X is a positive integer less than N to signify a marginal error condition.

19. Deskewing buffer circuits including in combination:

a given plurality of shift registers each having a first plurality of shift stages, each stage having a shift register output means, one of said stages in each shift register being an input stage for such shift register;

said given plurality of counters respectively operatively connected to said shift registers, one counter per shift register and each said counter selectively supplying an actuating signal to one of said register output means in the respective shift register in accordance with the signal content of said each counter;

said given plurality of input means supplying control signals to said counters and shift registers, respectively, for simultaneously actuating said counters to increment by one and said shift register to shift its signal contents by one stage toward one end of each said respective shift registers, data means in said input means simultaneously supplying data signals to said shift registers for storing same in said shift registers, respectively;

data output means for simultaneously receiving signals from any one stage in all said shift registers, said shift register output means in each said shift registers responsive to the signal content of the respective said counters to select said any one stage in accordance with the counter signal content, respectively, for supplying signals to said data output means;

control means responsive to said data output means to simultaneously decrement all counters; and means in said control means jointly responsive to said control means and to respective ones of said input means to inhibit changing the count state of the respective ones of said counters.

20. A data signal shift register buffer having a given number of shift stages, means for shifting the data signal content one stage at a time from a first end one shift stage toward a second end one shift stage, input data means, output data means, the improvement including in combination:

scanning means electrically interposed between one of said data means and said register for exchanging data signals between said one data means and any one of said shift stages, transfer means electrically interposed between one of said end one shift stages and a data means other than said one data means for exchanging data signals therebetween;

an up/down counter having said given number, plus one, of count states and corresponding count indicating lines, said count indicating lines being connected to said scanning means, said scanning means responsive to said stable count indicating states to transfer data signals between one of said shift stages corresponding to said shift states and said one data means said count state representing said given number, plus one, not having one of said corresponding lines, and control means responsive to said transferring means transferring a data signal to alter the stable count state of said up/down counter and including inhibit means jointly responsive to said scanning means and said transferring means, each transferring a data signal to inhibit said control means, and shift control means in said control means responsive to said transferring means to actuate said shift register to shift the data signal content one stage.

21. The method of deskewing data signals by using a given plurality of unidirectional shift registers, each having a predetermined number of interconnected shift stages adapted to shift signals one stage at a time from a first end stage to a second end stage, a separate up/-down counter controlling each shift register and each said up/down counter having a count modulus of said predetermined number, plus one said plus one state being a reference state;

the improved method including the steps of:

initially setting all up/down counters to said plus-one signal state;

executing a first data signal exchange by inserting data signals into predetermined shift stages of all said shift registers;

executing a second data signal exchange by extracting data signals from all said shift registers, one signal from each said shift register;

during a one of said data exchanges, shifting the signal contents of said shift registers one shift stage in a given direction and in another one of said data exchanges not shifting the signal contents;

incrementing the count state of said up/down counters by one synchronously with each said data insertion; and decrementing the count state of said up/down counters by one synchronously with each said data extraction.

22. The method set forth in claim 21 further including the steps of:

designating one shift stage in each shift register as an input stage for receiving all data signals to be inserted and designating one shift stage in each shift register by a present count state in its associated up/down counter as an output stage.

23. The method set forth in claim 21 further including the steps of:

designating a shift stage in each shift register in said one data exchange based upon the present count state in each said up/down counter;
designating one shift stage in each shift register as a shift stage in ach shift register for said another one of said data exchanges; and
repeatedly designating said one shift stage for said one data exchange in at least one of said shift registers.

24. The method set forth in claim 23 further including the steps of:
analyzing the count states in said up/down counters; and
when any one up/down counter reaches a predetermined count, supplying an indicating signal signifying a given deskewing status.

25. The method of operating a shift register having a given number of shift stages and shift means for shifting signal contents one stage at a time from a first end one stage toward a second end one stage between said shift stages;
including the steps of:
establishing a set of count states with modulus of said given number plus one, said count states lying between a plus-one end state and a reference end state;
signifying that the shift register is empty for a plus-one count state and that the shift register is full at a reference end count state that data signals are in some of but not all shift stages in said shift register for all other count states;
changing the count states by one toward said reference count state each time data is inserted into the shift register;
changing the count states by one toward said plus one count state each time data is extracted from the shift register; and
shifting the signal contents of said shift register each time said count states are changed by one not shifting the signal contents of said shift each time data is simultaneously inserted into and extracted from said shift register.

26. Shift register apparatus for effecting data signal exchanges between data input means, data output means and a shift register having a given number of shift stages, means interconnecting said shift stages for shifting signal content one stage at a time from a first end one shift stage toward a second end one shift stage thereof in response to a shift control signal,
the improvement including in combination:
an up/down counter having said given number, plus one, of stable signal state lines;
means connecting all but said plus-one of said stable signal state lines to said shift stages, respectively, each of said lines connected to only one of said shift stages;
data control means supplying said shift control pulse in response to said data signal exchanges; and
common counter control means in said counter jointly responsive to said data signal exchanges and said shift control pulse to selectively alter said up/down counter stable states in accordance therewith.

27. The shift register apparatus set forth in claim 26 further including in combination:
output control means in said data control means responsive to said plus-one state to inhibit any data exchanges which include taking data signals out of said shift register.

28. The shift register apparatus of claim 26 further including input control means in said data control means responsive to a predetermined count state of said up/down counter to inhibit data exchanges which include inserting data signals into said shift register.

29. The shift register apparatus set forth in claim 26 wherein said data control means further includes in combination:
input data control means capable of receiving data input signals for insertion into said shift register and inserting said received data signals into said shift register irrespective of the count state of said up/down counter;
output data control means having independent timing request means and operative to take data signals from said shift register in accordance with said independent timing means irrespective of the count state of said up/down counter; and
mode control means selecting one of said data control means to control operation of said shift register.

30. The shift register apparatus set forth in claim 29 further including in combination:
error means monitoring said up/down counter and responsive to said mode control means and to predetermined ones of said stable count states to signify an overrun or underrun type of error in accordance with said mode control means selection.

* * * * *